(12) United States Patent
Fukaya

(10) Patent No.: US 12,428,009 B2
(45) Date of Patent: Sep. 30, 2025

(54) NOTIFICATION DEVICE

(71) Applicant: TOYOTA JIDOSHA KABUSHIKI KAISHA, Toyota (JP)

(72) Inventor: Yuki Fukaya, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 17/553,033

(22) Filed: Dec. 16, 2021

(65) Prior Publication Data

US 2022/0194407 A1    Jun. 23, 2022

(30) Foreign Application Priority Data

Dec. 22, 2020    (JP) .................... 2020-212665

(51) Int. Cl.
*B60W 50/14*    (2020.01)
*B60W 50/02*    (2012.01)

(52) U.S. Cl.
CPC ........ *B60W 50/14* (2013.01); *B60W 50/0205* (2013.01); *B60W 2050/021* (2013.01); *B60W 2050/146* (2013.01); *B60W 2554/4041* (2020.02); *B60W 2554/4049* (2020.02)

(58) Field of Classification Search
CPC ............. B60W 50/14; B60W 50/0205; B60W 2050/021; B60W 2050/146; B60W 2554/4041; B60W 2554/4049; B60Q 1/507; B60Q 1/52; B60Q 1/50; B60Q 1/525; B60R 16/02; B60R 16/023
USPC ........................................................... 701/1
See application file for complete search history.

(56) References Cited

U.S. PATENT DOCUMENTS

| | | |
|---|---|---|
| 2013/0002135 A1 | 1/2013 | Kanamori et al. |
| 2015/0251585 A1* | 9/2015 | Jeong ............. G01S 19/16 701/36 |
| 2016/0355123 A1 | 12/2016 | Oooka |
| 2017/0120803 A1* | 5/2017 | Kentley ............. B60Q 1/525 |
| 2017/0120804 A1 | 5/2017 | Kentley et al. |

(Continued)

FOREIGN PATENT DOCUMENTS

| | | |
|---|---|---|
| CN | 108292356 A | 7/2018 |
| CN | 111439199 A | 7/2020 |

(Continued)

*Primary Examiner* — Tiffany P Young
*Assistant Examiner* — Ashleigh Nicole Turnbaugh
(74) *Attorney, Agent, or Firm* — Dinsmore & Shohl LLP

(57) ABSTRACT

A notification device, provided on a vehicle performing an evacuation or an emergency stop when a failure occurs, includes an optical notification unit provided on the vehicle and configured to emit light toward an outside of the vehicle, a notification direction specifying unit configured to specify a notification direction based on a current vehicle location or a scheduled stop location of the vehicle and map information or an external environment of the vehicle, wherein the notification direction is a direction in which notification is performed using the optical notification unit when the failure occurs, and an optical notification control unit configured to perform a failure notification control of the optical notification unit when the failure occurs. The optical notification control unit controls the optical notification unit such that the notification toward directions other than the notification direction is suppressed as compared with the notification toward the notification direction.

10 Claims, 8 Drawing Sheets

(56) References Cited

U.S. PATENT DOCUMENTS

| | | | |
|---|---|---|---|
| 2017/0120887 A1* | 5/2017 | Kurahashi | B60W 50/082 |
| 2017/0147004 A1 | 5/2017 | Reichel et al. | |
| 2018/0029604 A1 | 2/2018 | Niino et al. | |
| 2018/0186283 A1* | 7/2018 | Fischer | G07C 5/008 |
| 2020/0017022 A1* | 1/2020 | Pognon | H04W 4/12 |
| 2020/0231087 A1 | 7/2020 | Morimura et al. | |
| 2020/0262421 A1* | 8/2020 | Ito | B60W 10/18 |

FOREIGN PATENT DOCUMENTS

| | | |
|---|---|---|
| DE | 10-2016-209308 A1 | 12/2016 |
| JP | 2003-118424 A | 4/2003 |
| JP | 2008-037218 A | 2/2008 |
| JP | 2013-010368 A | 1/2013 |
| JP | 2013-248906 A | 12/2013 |
| JP | 2015171851 A * | 10/2015 |
| JP | 2016-016708 A | 2/2016 |
| JP | 2020-114695 A | 7/2020 |
| WO | 2017/079349 A1 | 5/2017 |

\* cited by examiner

NOTIFICATION DEVICE

TECHNICAL FIELD

The present disclosure relates to a notification device.

CROSS-REFERENCE TO RELATED APPLICATION

This application claims the benefit of priority from Japanese Patent Application No. 2020-212665, filed on Dec. 22, 2020, the entire contents of which are incorporated herein by reference.

BACKGROUND

In Japanese Unexamined Patent Publication No. 2013-248906, an emergency flicker control for flickering lamps at a rear portion of a vehicle during an emergency stop is disclosed.

SUMMARY

In the related art described above, the lamps are unconditionally used at the rear portion of the vehicle. Therefore, it may be difficult that other vehicles recognize notification of the vehicle by the lamps, depending on a situation around the vehicle (for example, a direction of the vehicle, a road environment, and the like). It is desired to suppress the electric power consumption of an optical notification unit such as a lamp, in a case of considering an influence on the remaining amount of batteries mounted on a vehicle.

An object of the present disclosure is to provide a notification device capable of performing notification to an outside of the vehicle according to a situation around the vehicle while suppressing electric power consumption of an optical notification unit when the vehicle is evacuated or emergently stops due to a failure.

A notification device according to one aspect of the present disclosure, which is provided on a vehicle performing an evacuation or an emergency stop when a failure occurs, includes an optical notification unit provided on the vehicle and configured to emit light toward an outside of the vehicle, a notification direction specifying unit configured to specify a notification direction based on a current vehicle location or a scheduled stop location of the vehicle and map information or an external environment of the vehicle, wherein the notification direction is a direction in which notification to the outside of the vehicle is performed using the optical notification unit when the failure occurs, and an optical notification control unit configured to perform a failure notification control of the optical notification unit when the failure occurs, in which the optical notification control unit controls the optical notification unit such that the notification toward directions other than the notification direction is suppressed as compared with the notification toward the notification direction.

In this notification device, the notification direction specifying unit specifies the notification direction that is a direction in which notification to an outside of the vehicle is performed using the optical notification unit when the failure occurs. Therefore, the optical notification unit can perform notification toward a direction in which the notification to an outside of the vehicle is required according to a situation around the vehicle. The optical notification control unit controls the optical notification unit such that the notification toward directions other than the notification direction is suppressed as compared with the notification toward the notification direction. Therefore, electric power consumption due to light toward a direction other than the notification direction emitted from the optical notification unit can be suppressed. Therefore, with the notification device according to the aspect of the present disclosure, it is possible to perform notification to an outside of the vehicle according to a situation around the vehicle while suppressing electric power consumption of an optical notification unit when the vehicle is evacuated or emergently stops due to a failure.

In some examples, the optical notification control unit may perform the failure notification control to suppress the notification after the vehicle completing a movement for an evacuation or an emergency stop as compared with the notification when the vehicle is moving for an evacuation or an emergency stop.

In some examples, the optical notification control unit may perform the failure notification control to suppress the notification toward all directions around the vehicle as compared with the notification when the vehicle is moving for an evacuation, if the vehicle is evacuated outside a road when the failure occurs.

In some examples, the optical notification control unit may perform the failure notification control to suppress the notification by preventing the optical notification unit from emitting light.

According to various aspects and examples of the present disclosure, it is possible to perform the notification to the outside of the vehicle according to a situation around the vehicle while suppressing electric power consumption of the optical notification unit when the vehicle is evacuated or emergently stops due to a failure.

DETAILED DESCRIPTION

Figure 1:
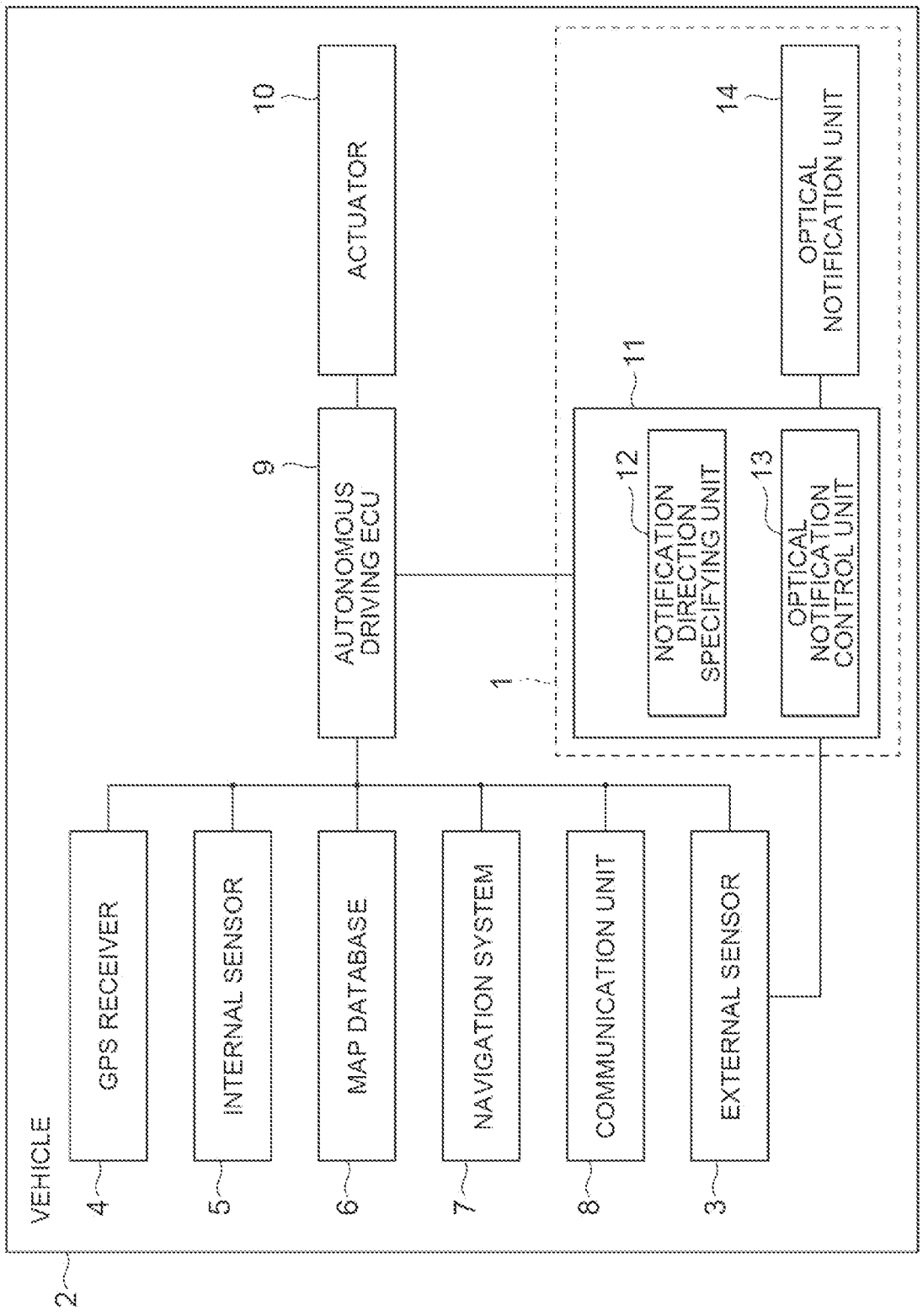
FIG. 1 is a functional block diagram of an example of a vehicle including an example of a notification device.

Hereinafter, an example of a notification device will be described with reference to drawings. In the following description, the same or corresponding elements are given the same reference numerals and repetitive description may not be repeated.

Configuration of Vehicle and Notification Device

FIG. 1 is a functional block diagram of an example of a vehicle including an example of a notification device. As illustrated in FIG. 1, a notification device 1 is installed in a vehicle 2 such as a passenger car, and notifies vehicles existing around the vehicle of information. The vehicle 2 includes, for example, an autonomous driving system. The autonomous driving system causes the vehicle 2 to travel by autonomous driving.

The autonomous driving is a driving state in which the vehicle 2 is autonomously traveled along a road on which the vehicle 2 travels. The autonomous driving includes, for example, a driving state in which the vehicle 2 autonomously travels toward a preset destination without a driver performing a driving operation. The autonomous driving includes, for example, autonomous driving level 2 to autonomous driving level 4 in Society of Automotive Engineers [SAE] J3016. The destination may be set by an occupant such as a driver and autonomously set by the vehicle 2. The autonomous driving may be vehicle control that causes the vehicle 2 to travel autonomously so as to follow the road without setting a destination. At the time of the autonomous driving, the driver does not need to perform a driving operation and the vehicle 2 travels autonomously.

The vehicle 2 is provided with an external sensor 3, a GPS receiver 4, an internal sensor 5, a map database 6, a navigation system 7, a communication unit 8, an autonomous driving electronic control unit [ECU] 9, and an actuator 10.

The external sensor 3 is detecting equipment that detects a situation around the vehicle 2 (an external environment of the vehicle). The external sensor 3 includes at least one of a camera and a radar sensor. The external sensor 3 may be configured to be able to reconstruct various properties of an external environment in which the vehicle 2 travels (vehicle location, relative distance to other vehicles, relative speed to other vehicles, directions of other vehicles, lane shape, lighting state of traffic lights, and the like).

The camera is imaging equipment that images a situation outside the vehicle 2. The camera is provided on a rear side of windshield glass of the vehicle 2. The camera transmits imaging information related to the situation outside the vehicle 2 to the autonomous driving ECU 9.

The camera may be a monocular camera and may be a stereo camera. The stereo camera includes two imaging units that are disposed such that binocular parallax is realized. Imaging information of the stereo camera also includes information in a depth direction.

The radar sensor is detecting equipment that detects an object around the vehicle 2 by using a radio wave (for example, millimeter wave) or light. The radar sensor includes, for example, a millimeter wave radar or a light detection and ranging (LiDAR). The radar sensor detects an object by transmitting a radio wave or light to the vicinity of the vehicle 2 and receiving the radio wave or light reflected by the object. The radar sensor transmits the detected object information to the autonomous driving ECU 9.

The GPS receiver 4 acquires location information indicating a location of the vehicle 2 by receiving signals from three or more GPS satellites. The location information includes, for example, latitude and longitude. Instead of the GPS receiver 4, other devices capable of specifying the latitude and the longitude of the vehicle 2 may also be used.

The internal sensor 5 is detecting equipment that detects a traveling state of the vehicle 2. The internal sensor 5 includes a vehicle speed sensor, an acceleration sensor, and a yaw rate sensor. The vehicle speed sensor is a detector that detects the speed of the vehicle 2. As the vehicle speed sensor, for example, a vehicle wheel speed sensor that is provided with respect to vehicle wheels of the vehicle 2 or a drive shaft integrally rotating with the vehicle wheels and that detects a rotation speed of vehicle wheels is used. The vehicle speed sensor transmits the detected vehicle speed information (wheel speed information) to the autonomous driving ECU 9.

The acceleration sensor is a detector that detects the acceleration of the vehicle 2. The acceleration sensor may include a front-rear acceleration sensor that detects the acceleration of the vehicle 2 in a front-rear direction and a lateral acceleration sensor that detects the acceleration of the vehicle 2. The acceleration sensor transmits, for example, the acceleration information of the vehicle 2 to the autonomous driving ECU 9. The yaw rate sensor is a detector that detects a yaw rate (rotary angular rate) around the vertical axis of the center of gravity of the vehicle 2. As the yaw rate sensor, a gyro sensor can be used, for example. The yaw rate sensor transmits the detected yaw rate information of the vehicle to the autonomous driving ECU 9.

The map database 6 is a storage device that stores map information. The map database 6 is formed in a storage medium such as a hard disk drive [HDD] installed in the vehicle 2, for example. The map information includes location information of a road, information of road shapes (for example, types of curves, straight portions, and the like, curvature radii of curves, shapes of intersections, widths of lanes, conditions of a road shoulder outside a road, emergency parking zones, and the like), location information of intersections and branch points, location information of structures, and the like. The structure may include facilities such as stores provided along the road. The map information may include various traffic rule information (one-way traffic, right or left turn prohibition, turn prohibition information, and the like) in association with a location of a lane on the map. A part of pieces of the map information included in the map database 6 may be stored in a storage device different from the HDD. The map database 6 may be formed in a computer of a facility such as a management center capable of communicating with the vehicle.

The navigation system 7 is a system that guides a driver of the vehicle 2 to a destination set in advance. The navigation system 7 recognizes, based on the location of the vehicle 2 measured by the GPS receiver 4 and the map information in the map database 6, a traveling road and a traveling lane on which the vehicle 2 travels. The navigation system 7 may calculate a target route from the location of the vehicle 2 to the destination and guide the driver along the target route by using a human machine interface [HMI].

The communication unit 8 is equipment for communicating with external equipment of the vehicle. The communication unit 8 may acquire information from a server of another vehicle or a facility such as a management center by wireless communication.

The actuator 10 is equipment used for autonomous driving control of the vehicle 2. The actuator 10 includes at least a driving actuator, a brake actuator, and a steering actuator. The driving actuator controls the driving force of the vehicle 2 by controlling the amount of air (for example, throttle opening degree) supplied to an engine in accordance with a control signal from the autonomous driving ECU 9. If the vehicle 2 is a hybrid vehicle, in addition to the amount of air supplied to the engine, a control signal from the autonomous driving ECU 9 is input to a motor as a power source to control the driving force. If the vehicle 2 is an electric vehicle, a control signal from the autonomous driving ECU 9 is input to a motor as a power source to control the driving force. The motor as a power source in these cases constitutes the actuator 10.

The brake actuator controls the braking force applied to the wheels of the vehicle 2 by controlling a brake system in response to a control signal from the autonomous driving ECU 9. As the brake system, for example, a hydraulic brake system can be used. The steering actuator controls the driving of an assist motor that controls steering torque in an electric power steering system in response to a control signal from the autonomous driving ECU 9. Therefore, the steering actuator controls the steering torque according to the control signal from the autonomous driving ECU 9.

The autonomous driving ECU 9 is a main component of the autonomous driving system. The autonomous driving ECU 9 controls the vehicle 2. The autonomous driving ECU 9 is an electronic control unit configured to include a central processing unit [CPU], a read only memory [ROM], a random access memory [RAM], a controller area network [CAN] communication circuit, and the like. The autonomous driving ECU 9 is connected to a network in which communication is performed using, for example, the CAN communication circuit and is connected to the above described components of the vehicle 2 to be able to communicate with each other. The autonomous driving ECU 9 realizes an autonomous driving function by operating the CAN communication circuit to input and output data, storing the data in the RAM, loading a program stored in the ROM into the RAM, and executing the program loaded into the RAM by the CPU, based on a signal output from the CPU, for example. The autonomous driving ECU 9 may be constituted of a plurality of electronic units.

The autonomous driving ECU 9 recognizes, as an example, an object (including a location of the object) around the vehicle 2 based on at least one of a result of detection obtained by the external sensor 3 or the map database 6. Examples of the object include dynamic objects such as pedestrians, bicycles, and other vehicles in addition to stationary objects without movement, such as utility poles, guardrails, trees, and buildings. The autonomous driving ECU 9 recognizes an object for every time the result of detection is acquired from the external sensor 3, for example. The autonomous driving ECU 9 recognizes an object around the vehicle 2 by, for example, pattern matching based on the result of detection (imaging information of a camera and an object detection result of the radar sensor) obtained by the external sensor 3. The autonomous driving ECU 9 may recognize an object around the vehicle 2 by techniques of other known methods.

The autonomous driving ECU 9 may detect, for example, a dynamic object out of recognized objects using pieces of information of stationary objects included in the map database 6. The autonomous driving ECU 9 may detect the dynamic object by techniques of other known methods. The autonomous driving ECU 9 may detect the movement amount of the dynamic object at that time, by the application of a Kalman filter, a particle filter, or the like with respect to the detected dynamic objects. The movement amount includes a movement direction and a movement speed of the dynamic objects. The movement amount may include the rotation speed of the dynamic object. The autonomous driving ECU 9 may perform movement amount error estimation.

The autonomous driving ECU 9 recognizes a traveling state of the vehicle 2 based on the results of detection obtained by the internal sensor 5 (for example, vehicle speed information of the vehicle speed sensor, acceleration information of the acceleration sensor, yaw rate information of the yaw rate sensor, and like). The traveling state of the vehicle 2 includes, for example, the vehicle speed, the acceleration, and the yaw rate.

The autonomous driving ECU 9 recognizes a location of the vehicle 2 (vehicle location) on the map based on the location information obtained by the GPS receiver 4 the result of detection obtained by the external sensor 3, the map information in the map database 6, and the like. The autonomous driving ECU 9 may recognize a location of the vehicle 2 by a simultaneous localization and mapping [SLAM] technique using the location information of stationary objects such as utility poles included in the map information in the map database 6 and the result of detection obtained by the external sensor 3. The autonomous driving ECU 9 may recognize a location of the vehicle by techniques of other known methods.

The autonomous driving ECU 9 generates a trajectory of the vehicle 2 based on, for example, the result of detection obtained by the external sensor 3, the map information in the map database 6, the recognized location of the vehicle, information on the recognized object, and the recognized traveling state of the vehicle 2. The autonomous driving ECU 9 generates a traveling plan according to, for example, the trajectory of the vehicle 2 based on the result of detection obtained by the external sensor 3 and the map database 6. By using a speed limit stored in the map database 6, the autonomous driving ECU 9 generates the traveling plan within a range in which the speed limit for a traveling lane is not exceeded. The autonomous driving ECU 9 may generate the traveling plan for the vehicle 2 to travel within a range in which a predetermined upper limit speed is not exceeded.

The autonomous driving ECU 9 may output the generated traveling plan as a traveling plan in which the trajectory of the vehicle 2 has a plurality of combinations of two elements of a target location p in a fixed coordinate system in the vehicle 2 and a speed V at each target point, that is, a plurality of configuration coordinates (p,V). Here, each target location p includes a location at least the X and Y coordinates in the fixed coordinate system in the vehicle 2 or information equivalent thereto. Note that, the traveling plan is not particularly limited as long as the traveling plan records behavior of the vehicle 2. Regarding the traveling plan, a target time t may be used instead of the speed V, for example, and the target time t and the direction of the vehicle 2 at that time may be added to the traveling plan. The traveling plan may be data indicating shifts of the vehicle speed, acceleration, steering torque, and others of the vehicle 2 when the vehicle 2 travels on the trajectory. The traveling plan may include a speed pattern, an acceleration pattern, and a steering pattern of the vehicle 2.

The autonomous driving ECU 9 autonomously controls the travel of the vehicle 2 based on the generated traveling plan. The autonomous driving ECU 9 outputs a control signal according to the traveling plan to the actuator 10. Thereby, the autonomous driving ECU 9 controls the traveling of the vehicle 2 such that the vehicle 2 autonomously travels in accordance with the trajectory.

The autonomous driving ECU 9 causes the vehicle 2 to travel by autonomous driving and monitors whether or not a failure occurs in the vehicle 2. The failure means a defect occurring in the component of the vehicle 2. An example of the defect includes a defect in which the autonomous driving cannot be continued after a predetermined time has elapsed, or a defect in which the autonomous driving cannot be continued without the degeneration function using alternative techniques. Such defects include, for example, an external sensor failure, an internal sensor failure, a failure in which the GPS receiver 4 or the communication unit 8 cannot receive information, a failure in which the driving force of the driving actuator is not exerted, a power supply failure, a brake failure, a shift failure, a tire puncture, and other defects that affect the autonomous driving system (for example, an ECU failure, a CAN failure, and the like). The power supply failure includes a failure of a main power supply. The power supply failure may include a failure of a second power supply (a failure of only a second power source). The brake failure includes a failure of a main brake. The brake failure may include a failure of a redundant brake. The external sensor failure includes at least one of a camera failure, a sonar sensor failure, or a radar sensor failure. If at least one of a side mirror abnormality or a headlight abnormality affects the recognition of the vehicle location, the abnormalities may be included in the external sensor failure. The internal sensor failure includes at least one of a vehicle speed sensor failure, an acceleration sensor failure, or a yaw rate sensor failure. The ECU failure includes at least one of a function failure related to the autonomous driving function, a function failure related to a clearance sonar, or a function failure related to the camera. The shift failure includes a main shift failure. The shift failure may also include a failure of a redundant system shift.

The autonomous driving ECU 9 may determine whether or not the vehicle 2 has a failure based on the number or degree of the abnormality (error) occurring in the vehicle. The autonomous driving ECU 9 may determine whether or not there is an abnormality of the vehicle 2 based on operation information or diagnostic information of equipment provided on the vehicle 2. The operation information is, for example, log information, and the diagnostic information is, for example, information (for example, status information and the like) obtained by a periodically executed command.

If it is determined that the failure of the vehicle 2 is occurring, the autonomous driving ECU 9 causes the vehicle 2 to be evacuated or to emergently stop. The autonomous driving ECU 9 decides a scheduled stop location using functioning equipment, and causes the vehicle to move to the predetermined stop position by the autonomous driving. That is, the notification device 1 is provided on the vehicle 2 performing an evacuation or an emergency stop when a failure occurs. The scheduled stop location is a location on the map where the failed vehicle 2 is moved to evacuate or emergently stop. The scheduled stop location may be decided by, for example, the autonomous driving ECU 9.

An evacuation means that the vehicle 2 moves to a location where the vehicle 2 does not interfere with traveling of other vehicles. As an example, if the vehicle 2 is in a situation in which the autonomous driving cannot be continued and the driver does not manually drive the vehicle 2, the vehicle 2 is evacuated to the outside of a road such as a road shoulder. The situation in which the autonomous driving cannot be continued is, for example, a failure of a main battery or a sensor abnormality. In this case, the scheduled stop location may be decided to be a space outside the road where the vehicle 2 can stop, a parking lot of a facility along the road, or the like.

The emergency stop is to stop the vehicle 2 immediately, and is performed in a situation in which the stop is more urgent than the evacuation. As an example, if the vehicle 2 is in a state in which the vehicle 2 cannot easily stop due to a brake failure, the vehicle 2 emergently stops by stopping the supply of the driving force to tires or applying a regenerative braking force of a drive motor.

The notification device 1 includes a notification ECU 11 and an optical notification unit 14. The notification ECU 11 is an electronic control unit that executes failure notification control for controlling notification by light emission of the optical notification unit 14. The notification ECU 11 is an electronic control unit having a CPU, ROM, RAM, CAN communication circuit, and the like. The notification ECU 11 is connected to a network in which communication is performed using the CAN communication circuit and is connected to the above described components of the vehicle 2 to be able to communicate with each other, for example. The notification ECU 11 realizes a notification function by operating the CAN communication circuit to input and output data, storing the data in the RAM, loading a program stored in the ROM into the RAM, and executing the program loaded into the RAM by the CPU, based on a signal output from the CPU, for example. The notification ECU 11 may be constituted of a plurality of electronic units. The notification ECU 11 may be included in the autonomous driving ECU 9.

The notification ECU 11 acquires, for example, a current vehicle location of the vehicle 2, a scheduled stop location of the vehicle 2, map information, and an external environment of the vehicle 2 as information necessary for executing the failure notification control.

The notification ECU 11 acquires a current vehicle location of the vehicle 2 based on location information from the GPS receiver 4, for example. The notification ECU 11 may acquire the current vehicle location of the vehicle 2 by a SLAM technique. The notification ECU 11 may acquire a location of the vehicle 2 on the map recognized by the autonomous driving ECU 9, or may acquire the current vehicle location of the vehicle 2 by techniques of other known methods.

The notification ECU 11 acquires, for example, the scheduled stop location of the vehicle 2 based on information of the scheduled stop location decided by the autonomous driving ECU 9.

The notification ECU 11 acquires, for example, a road environment (for example, a road shape, an intersection shape, presence or absence of one-way traffic, and the like) around the scheduled stop location of the vehicle 2 based on the map information. For example, if the vehicle 2 completes the movement for an evacuation or an emergency stop, the notification ECU 11 may acquire the road environment based on the external environment of the vehicle 2 detected by the external sensor 3 (for example, an intersection image imaged by the camera) in addition to the map information or instead of the map information.

Based on the detection result of the external sensor 3, the notification ECU 11 acquires a situation of other vehicles (for example, road configurations in which the other vehicles can travel) on the road around the vehicle 2 that has completed the movement for an evacuation or an emergency stop as the external environment of the vehicle 2. The notification ECU 11 can recognize whether or not there are the other vehicles approaching the vehicle 2 based on the road environment and the situation of the other vehicles on the road around the vehicle 2.

The optical notification unit 14 is equipment provided on the vehicle 2 and configured to emit light toward the outside of the vehicle. The optical notification unit 14 is connected to the notification ECU 11 and emits light based on an output signal of the notification ECU 11. The optical notification unit 14 performs notification to the outside of the vehicle 2 (outside the vehicle) using light.

Figure 2A:
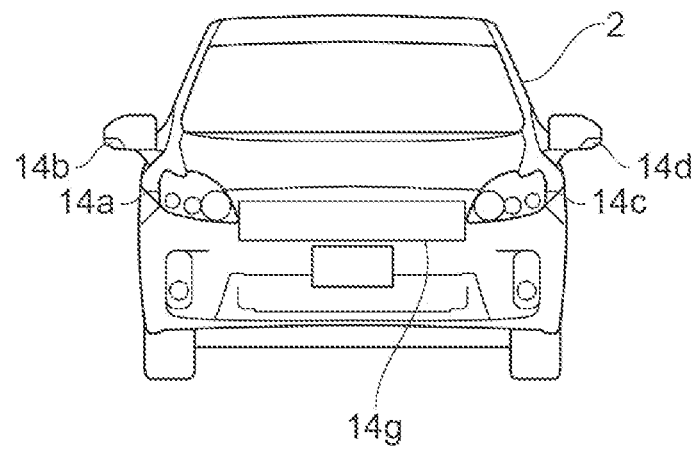
FIG. 2A is a diagram illustrating an example of in-vehicle installation positions of optical notification units.
Figure 2B:
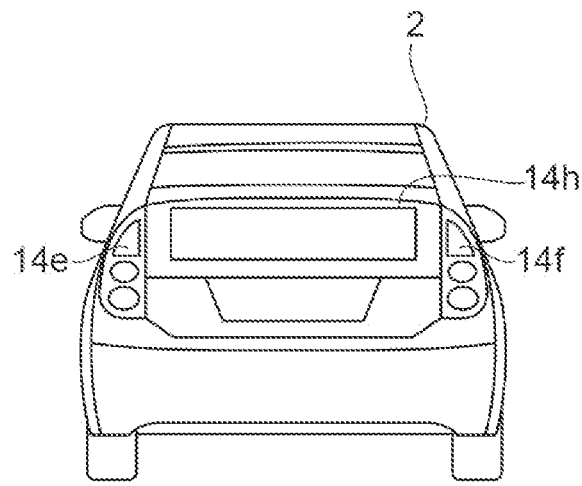
FIG. 2B is a diagram illustrating an example of in-vehicle installation positions of optical notification units.
Figure 2C:
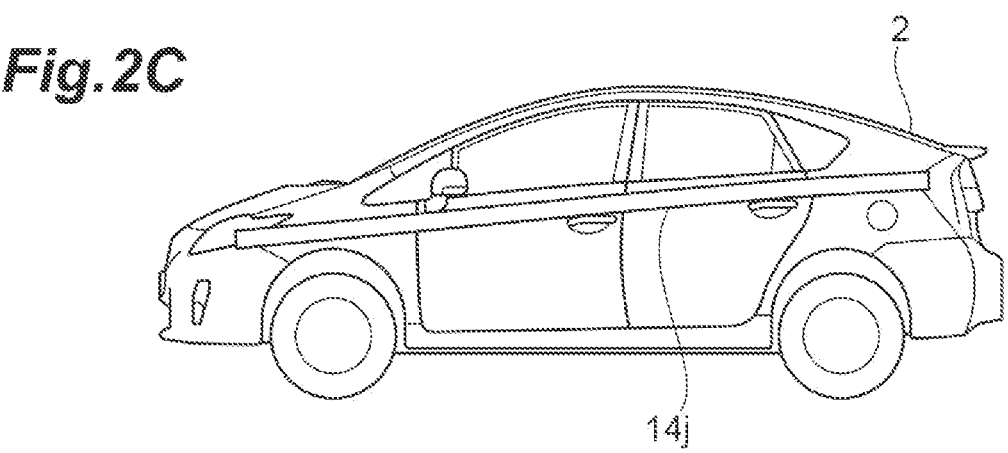
FIG. 2C is a diagram illustrating an example of an in-vehicle installation position of an optical notification unit.

An example of the optical notification unit 14 is a direction indicator. The optical notification unit 14 is disposed at a location capable of being visually recognized at the front, rear, or side of the vehicle 2. FIG. 2A to 2C are diagrams illustrating examples of in-vehicle installation positions of the optical notification units. As illustrated in FIG. 2A, for example, direction indicators 14a to 14d are provided on the front side and door mirrors of the vehicle 2 as the optical notification unit 14. As illustrated in FIG. 2B, for example, direction indicators 14e and 14f are provided on the rear side of the vehicle 2 as the optical notification unit 14. A head lamp or a brake lamp may be used together as the optical notification unit 14.

The optical notification unit 14 may be a display device. As illustrated in FIG. 2A, for example, a front display device 14g is provided as the optical notification unit 14 on a grille portion on the front surface of the vehicle 2. As illustrated in FIG. 2B, for example, a rear display device 14h is provided as the optical notification unit 14 on the rear surface of the vehicle 2. As illustrated in FIG. 2C, for example, a side display device 14j is provided as the optical notification unit 14 on the side surface of the vehicle 2. The optical notification unit 14 is not limited to the example illustrated in FIG. 2A to 2C. A plurality of display devices may be provided on the grille portion on the front surface of the vehicle 2. A plurality of display devices may be provided on the rear surface or the side surface of the vehicle 2.

The failure notification control by the notification ECU 11 will be described in detail. The notification ECU 11 includes a notification direction specifying unit 12 configured to specify a notification direction, and an optical notification control unit 13 configured to perform a failure notification control of the optical notification unit 14 when a failure occurs. The failure notification control is a light emission control of the optical notification unit 14 configured to perform notification of an evacuation or an emergency stop of the vehicle 2 due to a failure.

The notification direction specifying unit 12 specifies the notification direction based on a current vehicle location or a scheduled stop location of the vehicle 2 and map information or an external environment of the vehicle 2. The notification direction is a direction in which the optical notification unit 14 is used to notify the outside of the vehicle when the failure occurs.

The notification direction specifying unit 12 specifies, for example, a direction in which other vehicles approaching the vehicle 2 whose movement for an evacuation or an emergency stop has been completed may exist, as the notification direction. More specifically, the notification direction specifying unit 12 determines whether or not the movement of the vehicle 2 for an evacuation or an emergency stop is completed based on, for example, the current vehicle location and the scheduled stop location of the vehicle 2. The notification direction specifying unit 12 determines that the movement of the vehicle 2 for an evacuation or an emergency stop is completed when the current vehicle location of the vehicle 2 reaches the scheduled stop location. Here, the "current vehicle location of the vehicle 2 reaches the scheduled stop location" means that, for example, the current vehicle location of the vehicle 2 is located within a range of a predetermined distance surrounding the scheduled stop location on the map. The notification direction specifying unit 12 may determine that the movement of the vehicle 2 is completed when a vehicle speed of the vehicle 2 is equal to or less than a predetermined stop threshold value based on the vehicle speed of the vehicle 2 after the movement of the vehicle 2 is started for the evacuation or the emergency stop.

The notification direction specifying unit 12 specifies a direction in which other vehicles approaching the vehicle 2 whose movement for an evacuation or an emergency stop has been completed may exist when the notification direction specifying unit 12 determines that the movement of the vehicle 2 for an evacuation or an emergency stop is completed, as the notification direction.

In a case of a road environment in which there is little possibility that other vehicles approaching the vehicle 2 whose movement for an evacuation or an emergency stop has been completed exist, the notification to the outside of the vehicle using the optical notification unit 14 can be omitted. Therefore, the electric power consumption of the optical notification unit 14 can be suppressed. If the movement of the vehicle 2 for an evacuation or an emergency stop is completed, the notification direction specifying unit 12 may further determine whether or not the movement of the vehicle 2 is an "evacuation to the outside of the road". If the movement of the vehicle 2 is the "evacuation to the outside of the road", it can be considered that there is little possibility that other vehicles approaching the vehicle 2 whose movement for an evacuation or an emergency stop has been completed exist.

Specifically, the notification direction specifying unit 12 determines, for example, whether or not the movement of the vehicle 2 is the "evacuation to the outside of the road" based on the current vehicle location (a location of the vehicle 2 whose movement is completed) or the scheduled stop location of the vehicle 2 and the map information or the external environment of the vehicle 2. For example, when the current vehicle location or the scheduled stop location of the vehicle 2 is an evacuation place outside the road, the notification direction specifying unit 12 determines that the movement of the vehicle 2 is the "evacuation to the outside of the road". For example, when the current vehicle location or the scheduled stop location of the vehicle 2 is not the evacuation place outside the road, the notification direction specifying unit 12 determines that the movement of the vehicle 2 is not the "evacuation to the outside of the road".

Even though the movement of the vehicle 2 for an evacuation or an emergency stop is completed, the notification direction specifying unit 12 specifies the notification direction based on the current vehicle location (a location of the vehicle 2 whose movement is completed) or the scheduled stop location of the vehicle 2 and the map information or the external environment of the vehicle 2 when the movement of the vehicle 2 is not the "evacuation to the outside of the road". The notification direction specifying unit 12 specifies, for example, a direction in which other vehicles approaching the vehicle 2 that is evacuated or emergently stops in the road may exist, as the notification direction. In this case, the notification direction is a direction in which the other vehicles approaching the vehicle 2 that has completed the movement may exist, depending on the road environment such as a road shape, an intersection shape, and presence or absence of one-way traffic. The notification direction specifying unit 12 can specify, for example, a direction where a lane along which other vehicles can travel toward the vehicle 2 that has been evacuated or has emergently stopped in the road can travel extends, as the notification direction based on the current vehicle location (a location of the vehicle 2 whose movement is completed) of the vehicle 2 and the road environment.

The notification direction specifying unit 12 may use the scheduled stop location of the vehicle 2 in addition to the current vehicle location of the vehicle 2 or instead of the current vehicle location of the vehicle 2. The notification direction specifying unit 12 may use the road environment included in the external environment of the vehicle 2 in addition to the intersection shape included in the map information or instead of the intersection shape included in the map information. As the road environment included in the external environment of the vehicle 2, for example, an intersection image imaged by the camera, a situation of other vehicles on the road around the vehicle 2 (for example, a traveling direction of the other vehicles with respect to the vehicle 2), and the like can be used.

The notification direction specifying unit 12 may not specify a direction in which there is little possibility that other vehicles approaching the vehicle 2 exist depending on the road environment as the notification direction. The "direction in which there is little possibility that other vehicles approaching the vehicle 2 exist" means a direction in which a road configuration is such that there is no other vehicle approaching the vehicle 2 depending on the road environment. For example, when the movement of the vehicle 2 for an evacuation or an emergency stop has been completed and the movement of the vehicle 2 is the evacuation to the outside of the road, the road configuration is such that there is no other vehicle approaching the vehicle 2 depending on the road environment with the outside of the road. Therefore, the notification direction specifying unit 12 may specify that there is no notification direction since all directions around the vehicle 2 correspond to directions other than the notification direction.

Furthermore, when the current vehicle location of the vehicle 2 has not reached the scheduled stop location (when the movement for an evacuation or an emergency stop has not been completed), the notification direction specifying unit 12 may specify all directions around the vehicle 2 as the notification direction.

The optical notification control unit 13 may change a light emission mode of the optical notification unit 14 depending on whether the failure does not occur, that is, the normal autonomous driving is performed or the failure occurs, for example. For example, when the failure occurs, the optical notification control unit 13 may change the light emission mode of the optical notification unit 14 depending on whether the vehicle 2 is evacuated or the vehicle 2 emergently stops. For example, when the failure occurs, the optical notification control unit 13 may change the light emission mode of the optical notification unit 14 depending on whether the movement of the vehicle 2 for an evacuation or an emergency stop is not completed or the movement of the vehicle 2 for an evacuation or an emergency stop is completed.

Light Emission Mode when Traveling by Normal Autonomous Driving

When traveling by normal autonomous driving, the optical notification control unit 13 controls direction indicators 14a to 14f based on an instruction from the driver or the autonomous driving ECU 9. For example, the optical notification control unit 13 causes direction indicators 14a, 14b, and 14f to flicker based on a lever operation of the driver or a direction instruction of the autonomous driving ECU 9 at the time of preparation of a right turn or lane change to the right. The optical notification control unit 13 causes direction indicators 14c, 14d, and 14e to flicker based on a lever operation of the driver or a direction instruction of the autonomous driving ECU 9 at the time of preparation of a left turn or lane change to the left. The optical notification control unit 13 causes the direction indicators 14a to 14f to flicker in the same cycle based on a hazard switch operation of the driver, or a hazard instruction of the autonomous driving ECU 9 at the time of stopping or the like.

When traveling by the normal autonomous driving, the optical notification control unit 13 may change the display of the front display device 14g, the rear display device 14h, and the side display device 14j in accordance with an execution state of the autonomous driving. For example, the optical notification control unit 13 may cause the front display device 14g, the rear display device 14h, and the side display device 14j to be turned on during the autonomous driving, and to be turned off during no autonomous driving (that is, during the manual driving).

Light Emission Mode when Failure Occurs

As the failure notification control, the optical notification control unit 13 can change the light emission mode of the optical notification unit 14 toward the notification direction when the failure occurs. The light emission mode is changed by a lighting state (light-on, flicker, light-off), light amount at lighting (light intensity), a flickering speed (flickering cycle), a lighting synchronization state, a flow pattern of LED winkers that can be turned on sequentially, a color of light emission, display contents of each display device, and the like being changed. The light emission mode may be changed by a lighting pattern combination of each direction indicator and each display device. For example, when causing the direction indicator to flicker and causing the display device to turn off, the change of the light emission mode also includes when causing both the direction indicator and the display device to flicker. In this way, the notification device 1 notifies other vehicles and the like around the vehicle 2 of the occurrence of a failure in the vehicle 2 by causing the optical notification unit 14 to emit light toward the outside of the vehicle.

Visibility of the vehicle 2 from other vehicles around the vehicle 2 and the electric power consumption of the optical notification unit 14 vary depending on the light emission mode. Here, as an example of the light emission mode, the optical notification unit 14 is controlled by any one of a first mode, a second mode, or a third mode.

The first mode is a light emission mode of the optical notification unit 14 during the movement of the vehicle 2 for an evacuation or an emergency stop. The first mode can be a light emission mode emphasizing the fact that the vehicle 2 during the movement for an evacuation or an emergency stop is easily visible from other vehicles or the like around the vehicle 2. In the first mode, since the visibility of the vehicle 2 is prioritized, the electric power consumption of the optical notification unit 14 may not be necessary to be suppressed.

The "visibility of the vehicle 2 from other vehicles around the vehicle 2" corresponds to a strength of a visual stimulus according to the light emission mode such as a lighting state (light-on, flicker, light-off), light amount at lighting (light intensity), flickering speed, and lighting synchronization state of the optical notification unit 14. For example, the stronger the visual stimulus, the easier the visibility of the vehicle 2 recognized by other vehicles or the like around the vehicle 2. On the other hand, the electric power consumption of the optical notification unit 14 tends to be suppressed as the strength of the visual stimulus is weakened.

The second mode is a light emission mode of the optical notification unit 14 toward the notification direction after the movement of the vehicle 2 for an evacuation or an emergency stop in the road is completed. Since the second mode is the mode in which light is emitted toward the notification direction, the second mode is a light emission mode emphasizing the fact that the vehicle 2 is easily visible from other vehicles or the like around the vehicle 2. The second mode is a mode in which the vehicle 2 is more easily visible from other vehicles or the like around the vehicle 2 than the third mode. The second mode may be a light emission mode different from the first mode. In this case, with respect to the visual stimulus, the second mode may be a mode having a stronger visual stimulus than the third mode and a weaker visual stimulus than the first mode.

The third mode is a light emission mode of the optical notification unit 14 toward directions other than the notification direction after the movement of the vehicle 2 for an evacuation or an emergency stop in the road is completed. Since the third mode is a mode in which light is emitted toward directions other than the notification direction, the third mode is different from the second mode in that the light emission mode emphasizing the fact that the electric power consumption of the optical notification unit 14 is suppressed. The third mode is a light emission mode different from the first mode and the second mode, and is a mode in which the electric power consumption of the optical notification unit 14 is more easily suppressed than the first mode and the second mode.

In the following, as an example of a specific driving scene, a light emission mode of the optical notification unit 14 and a notification example in the driving scene will be outlined. The light emission mode and the notification example are not limited to the described examples.

Figure 3:
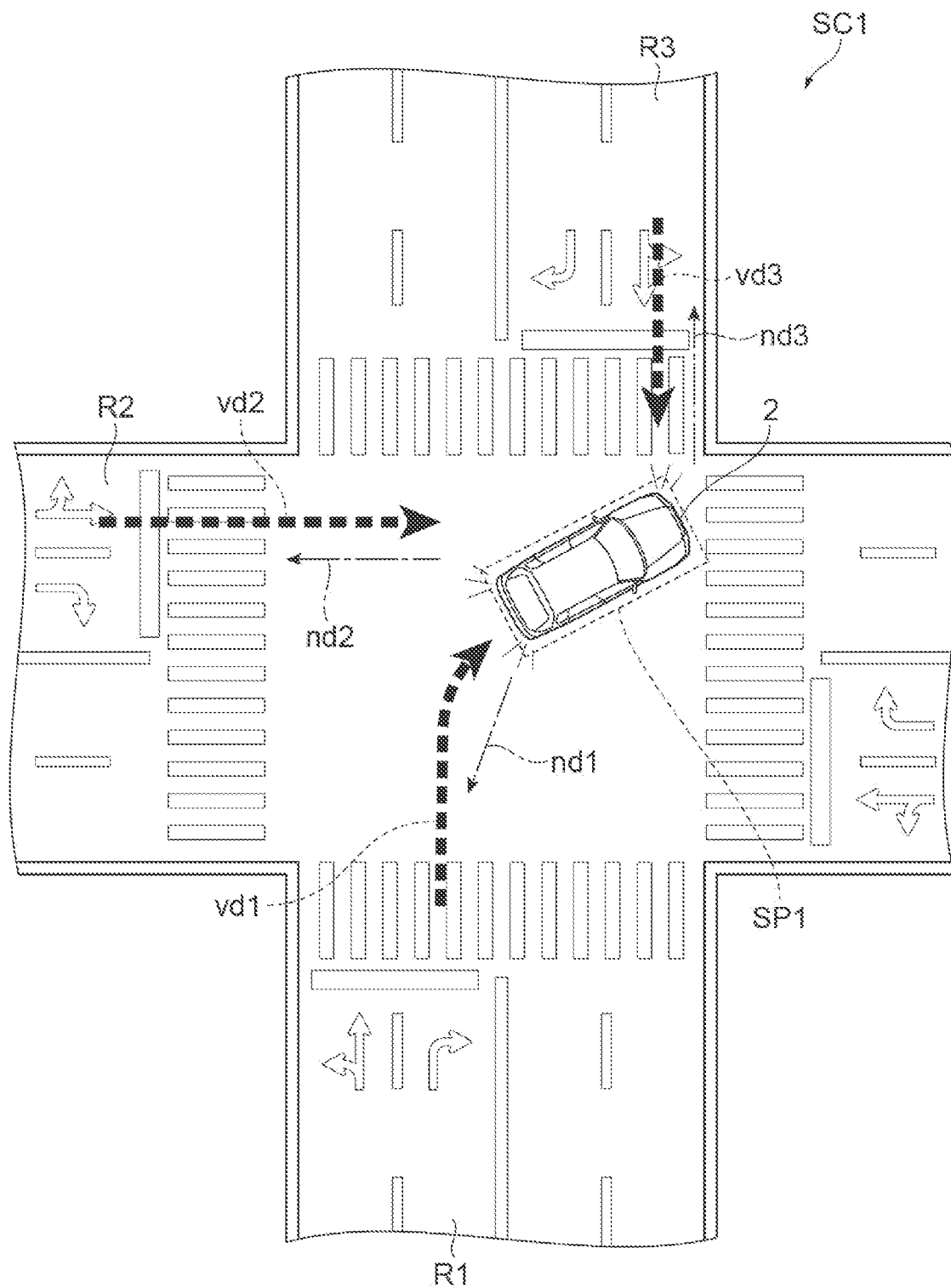
FIG. 3 is a diagram illustrating an example of a driving scene in which a failure notification control is performed.

FIG. 3 is a diagram illustrating an example of a driving scene in which a failure notification control is performed. In FIG. 3, as a driving scene SC1, a state in which the vehicle 2 emergently stops at a scheduled stop location SP1 in a crossroad intersection due to the occurrence of a failure while the vehicle 2 traveling along a lane R1 by autonomous driving turns right at a crossroads intersection is illustrated. In the example illustrated in FIG. 3, the autonomous driving ECU 9 sets the scheduled stop location SP1 that is an emergency stop location in front of the location of the vehicle 2 when the occurrence of the failure is recognized. Based on the external environment and the traveling state (vehicle speed, or the like) of the vehicle 2, the autonomous driving ECU 9 causes the vehicle 2 to move so as to decelerate and stop at the scheduled stop location SP1 while avoiding contact with obstacles, and executes an emergency stop control by transmitting control signals to a power train ECU, a steering ECU, and a brake ECU (not shown). The autonomous driving ECU 9 completes the movement of the vehicle 2 when the vehicle 2 has stopped at the scheduled stop location SP1.

In general, interest from others to the vehicle moving for an evacuation or an emergency stop is higher than interest from others to the vehicle having stopped. Therefore, when the movement of the vehicle 2 for an emergency stop is not completed after the failure occurs in FIG. 3 (during the movement of the vehicle 2 for an emergency stop), the optical notification control unit 13 executes the notification in the first mode toward all directions around the vehicle 2 as a failure notification control. In the example of FIG. 3, the notification in the first mode is performed after the occurrence of the failure until the movement of the vehicle 2 for the emergency stop to the scheduled stop location SP1 is completed.

The "notification toward all directions around the vehicle 2" means that the optical notification unit 14 emits light with optical shafts that spread radially around the vehicle 2 to notify the outside of the vehicle. The directions that spread radially may include a direction along the horizontal plane including the vehicle 2. The optical notification control unit 13 may cause all the direction indicators 14*a* to 14*f* provided on the vehicle 2 to flicker as the notification toward all directions around the vehicle 2. The optical notification control unit 13 may cause all of the front display device 14*g*, the rear display device 14*h*, and the side display device 14*j* provided on the vehicle 2 to flicker as the notification toward all directions around the vehicle 2. The optical notification control unit 13 may also use, for example, a headlight, a brake lamp, and the like together.

Then, after the movement of the vehicle 2 for an emergency stop is completed (after the vehicle 2 reaches the scheduled stop location SP1), the notification direction specifying unit 12 specifies a direction in which other vehicles approaching the vehicle 2 that emergently stops may exist, as the notification direction. In the example of FIG. 3, another vehicle from the lane R1 can travel along a traveling direction vd1, another vehicle from a lane R2 can travel along a traveling direction vd2, and another vehicle from a lane R3 can travel along a traveling direction vd3, toward the vehicle 2 having emergently stopped at the scheduled stop location SP1. Therefore, the notification direction specifying unit 12 specifies the notification directions nd1, nd2, and nd3 corresponding to directions along which the lanes R1, R2, and R3 extend as the direction in which another vehicle approaching the vehicle 2 that emergently stops at the scheduled stop location SP1 may exist, based on the scheduled stop location SP1 that is a location of the vehicle 2 whose movement is completed and the road environment in FIG. 3.

The optical notification control unit 13 executes the notification in the second mode toward the specified notification directions nd1, nd2, and nd3. For example, as the second mode, the optical notification control unit 13 may cause the optical notification unit 14 to flicker later (at a lower frequency) than that of the first mode. For example, as the second mode, the optical notification control unit 13 may cause the optical notification unit 14 to light or flicker with a light amount darker than the light amount of the first mode. That is, the optical notification control unit 13 may perform the failure notification control to suppress the notification in the second mode after the vehicle 2 completing a movement for an evacuation or an emergency stop as compared with the notification in the first mode when the vehicle 2 is moving for an evacuation or an emergency stop.

The "notification toward a notification direction" means to cause the optical notification unit 14 to emit light toward the notification direction among the optical shafts that spread radially around the vehicle 2 so as to notify the outside of the vehicle. In the example of FIG. 3, the optical notification control unit 13 may cause the direction indicators 14*c*, 14*d*, 14*e*, and 14*f* to flicker as the notification toward the notification directions nd1, nd2, and nd3. The optical notification control unit 13 may cause the front display device 14*g*, the rear display device 14*h*, and the side display device 14*j* on the left side of the vehicle body to light or flicker as the notification toward the notification directions nd1, nd2, and nd3.

The optical notification control unit 13 more suppresses the notification toward directions other than the notification directions nd1, nd2, and nd3 than that of the second mode. For example, the optical notification control unit 13 executes the notification in the third mode, which is more suppressed than that of the second mode, toward the directions other than the notification directions nd1, nd2, and nd3. For example, as the third mode, the optical notification control unit 13 may cause the optical notification unit 14 to flicker later (at a lower frequency) than that of the second mode. For example, as the third mode, the optical notification control unit 13 may cause the optical notification unit 14 to light or flicker with a light amount darker than the light amount of the second mode. The optical notification control unit 13 may cause the direction indicators 14a and 14b to flicker as the notification toward directions other than the notification directions nd1, nd2, and nd3. The optical notification control unit 13 may cause the side display device 14j on the right side of the vehicle body to light or flicker as the notification toward directions other than the notification directions nd1, nd2, and nd3. The optical notification control unit 13 may perform the failure notification control to suppress the notification with respect to the second mode by preventing the direction indicators 14a and 14b and the side display device 14j on the right side of the vehicle body from emitting light to the directions other than the notification directions nd1, nd2, and nd3. Thereby no light is emitted from the direction indicators 14a and 14b and the side display device 14j on the right side of the vehicle body.

Figure 4:
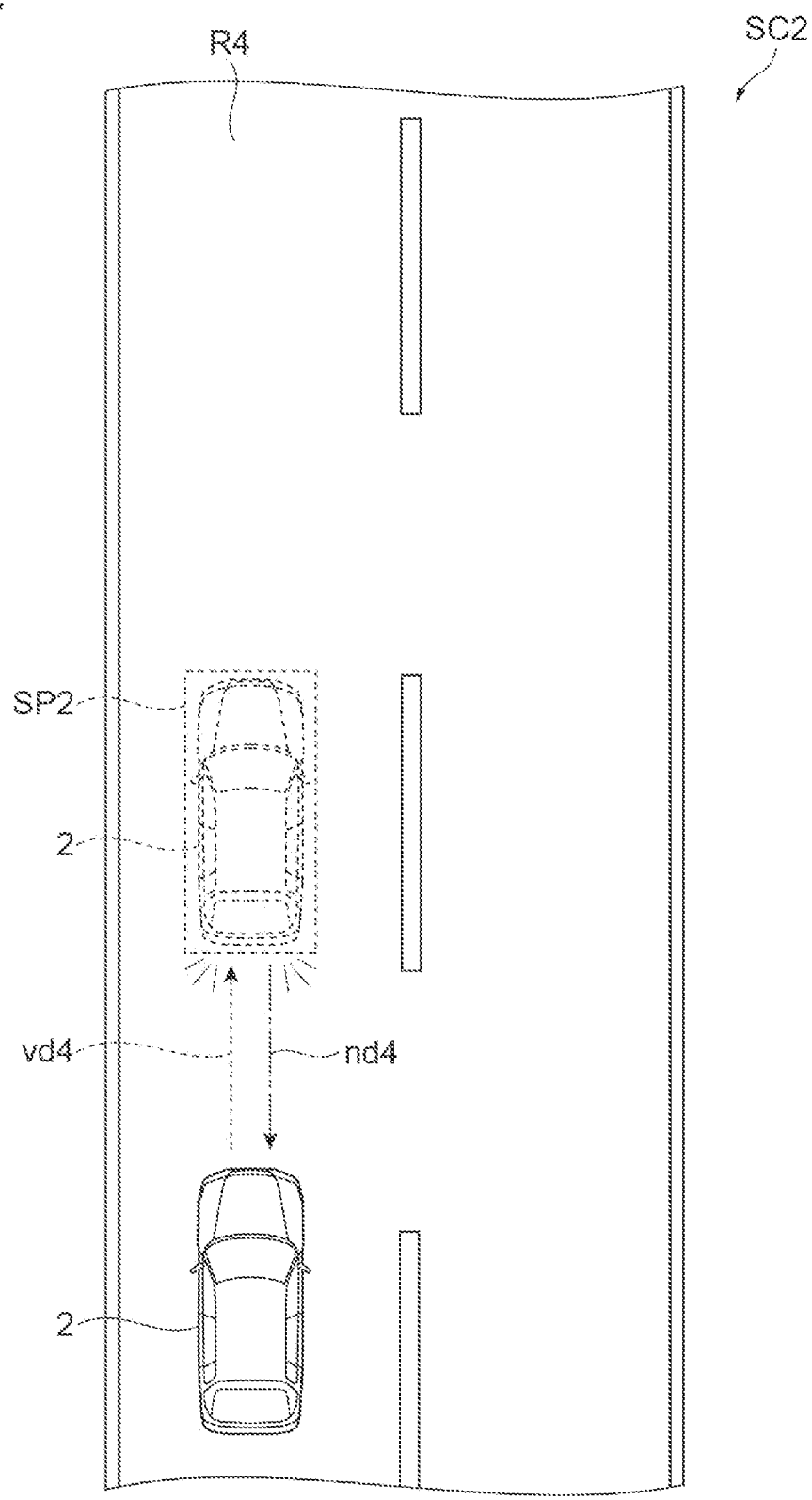
FIG. 4 is a diagram illustrating another example of a driving scene in which a failure notification control is performed.

FIG. 4 is a diagram illustrating another example of a driving scene in which a failure notification control is performed. In FIG. 4, as a driving scene SC2, a state in which the vehicle 2 that has traveled by the autonomous driving along a lane R4 of a straight road emergently stops at a scheduled stop location SP2 in the lane R4 due to the occurrence of a failure is illustrated. In the example illustrated in FIG. 4, the autonomous driving ECU 9 sets the scheduled stop location SP2 that is an emergency stop location in front of the location of the vehicle 2 when the occurrence of the failure is recognized. The autonomous driving ECU 9 starts the movement of the vehicle 2 while decelerating so as not to interfere with other vehicles and road structures in the vicinity until the vehicle 2 moves to the scheduled stop location SP2. The autonomous driving ECU 9 completes the movement of the vehicle 2 when the vehicle 2 has stopped at the scheduled stop location SP2.

In FIG. 4, as similar to that of FIG. 3, the optical notification control unit 13 executes the notification in the first mode toward all directions around the vehicle 2 as the failure notification control, after the failure occurs until the movement of the vehicle 2 for an emergency stop to the scheduled stop location SP2 is completed.

Then, after the movement of the vehicle 2 for an emergency stop is completed (after the vehicle 2 reaches the scheduled stop location SP2), the notification direction specifying unit 12 specifies a notification direction nd4 corresponding to the upstream of the lane R4 as the direction in which another vehicle approaching the vehicle 2 that emergently stops at the scheduled stop location SP2 may exist, based on the scheduled stop location SP2 that is a location of the vehicle 2 whose movement is completed and the road environment in FIG. 4. This is because another vehicle from the upstream of the lane R4 can travel along a traveling direction vd4 toward the vehicle 2 that has emergently stopped at the scheduled stop location SP2.

The optical notification control unit 13 executes the notification in the second mode toward the specified notification direction nd4. In the example of FIG. 4, the optical notification control unit 13 may cause the direction indicators 14e and 14f to flicker at the second mode as the notification toward the notification direction nd4. The optical notification control unit 13 may cause the rear display device 14h to light or flicker at the second mode as the notification toward the notification direction nd4.

The optical notification control unit 13 more suppresses the notification toward directions other than the notification direction nd4 than that of the second mode. For example, the optical notification control unit 13 executes the notification in the third mode, which is more suppressed than that of the second mode, toward the directions other than the notification direction nd4. The optical notification control unit 13 may cause the direction indicators 14a, 14b, 14c, and 14d to flicker at the third mode as the notification toward directions other than the notification direction nd4. The optical notification control unit 13 may cause the front display device 14g and the side display device 14j to light or flicker at the third mode as the notification toward the notification direction nd4. The optical notification control unit 13 may perform the failure notification control to suppress the notification with respect to the second mode by preventing the direction indicators 14a, 14b, 14c, and 14d, the front display device 14g, and the side display device 14j from emitting light to the directions other than the notification direction nd4. Thereby no light is emitted from the direction indicators 14a, 14b, 14c, and 14d, the front display device 14g, and the side display device 14j.

Figure 5:
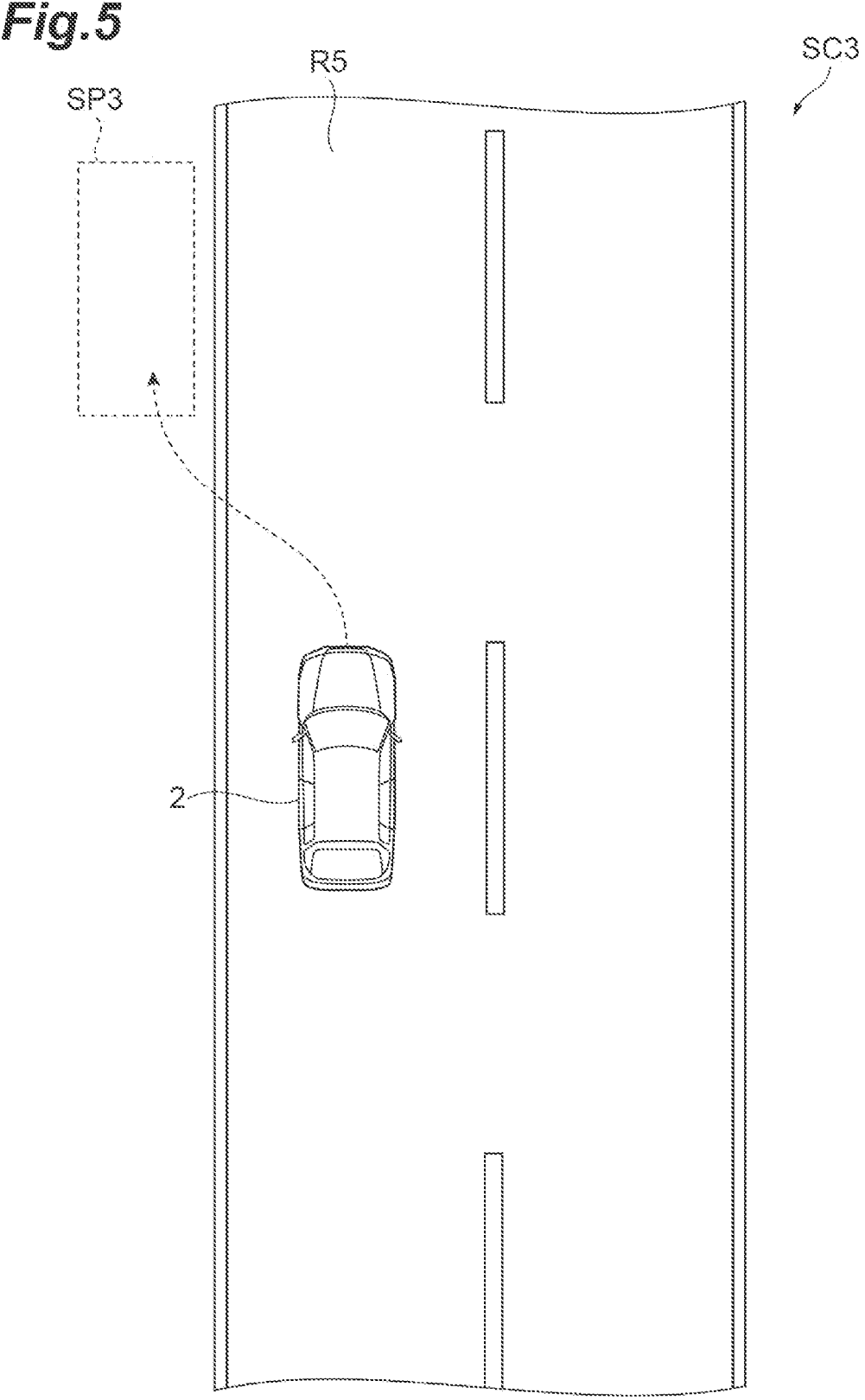
FIG. 5 is a diagram illustrating another example of a driving scene in which a failure notification control is performed.

FIG. 5 is a diagram illustrating the other example of a driving scene in which a failure notification control is performed. In FIG. 5, as a driving scene SC3, a state in which the vehicle 2 that has traveled by the autonomous driving along a lane R5 of a straight road is evacuated to a scheduled stop location SP3 that is an evacuation place of a road shoulder (the outside of the road) of the lane R5 due to the occurrence of a failure. The evacuation place may be a road shoulder without obstacles, or may be an emergency parking zone provided on the side of the road (a space provided on the side of the road for the purpose of stopping failed vehicles or vehicles in an emergency state).

In the example illustrated in FIG. 5, the autonomous driving ECU 9 specifies the scheduled stop location SP3 from the external environment detected by the external sensor 3 when the occurrence of the failure is recognized, as an evacuation place (a vacant road shoulder space, an emergency parking zone, or the like) where the vehicle 2 can be evacuated in the vicinity thereof. The autonomous driving ECU 9 may specify an evacuation place by referring to the map information. Based on the external environment and the traveling state (vehicle speed, or the like) of the vehicle 2, the autonomous driving ECU 9 generates an evacuation travel plan in order to reach the scheduled stop location SP3 that is a destination while avoiding contact with obstacles. The autonomous driving ECU 9 executes an evacuation control by transmitting control signals to the power train ECU, the steering ECU, and the brake ECU (not illustrated) based on the evacuation travel plan. The autonomous driving ECU 9 completes the movement of the vehicle 2 when the vehicle 2 has stopped at the scheduled stop location SP3.

In FIG. 5, as similar to those of FIG. 3 and FIG. 4, the optical notification control unit 13 executes the notification in the first mode toward all directions around the vehicle 2 as the failure notification control, after the failure occurs until the movement of the vehicle 2 for an evacuation to the scheduled stop location SP3 is completed.

Then, after the movement of the vehicle 2 for an evacuation is completed (after the vehicle 2 reaches the scheduled stop location SP3), the notification direction specifying unit 12 specifies the fact that there is no notification direction as there is little possibility that other vehicles approaching the vehicle 2 evacuated to the scheduled stop location SP3 exist, based on the scheduled stop location SP3 that is a location of the vehicle 2 whose movement is completed and the road environment in FIG. 5. This is because a position of the other vehicle traveling along the lane R4 is apart from the position of the vehicle 2 evacuated to the scheduled stop location SP3, and there is little possibility that other vehicles approaching the vehicle 2 exist based on the road environment illustrated in FIG. 5.

For example, when the movement of the vehicle 2 for an evacuation is completed and the movement of the vehicle 2 is an evacuation to the outside of the road, the optical notification control unit 13 causes the optical notification unit 14 to emit no light to all directions around the vehicle 2. That is, the optical notification control unit 13 performs the failure notification control to suppress the notification toward all directions around the vehicle 2 as compared with the notification when the vehicle 2 is moving for an evacuation, if the vehicle 2 is evacuated outside the road when the failure occurs.

Figure 6:
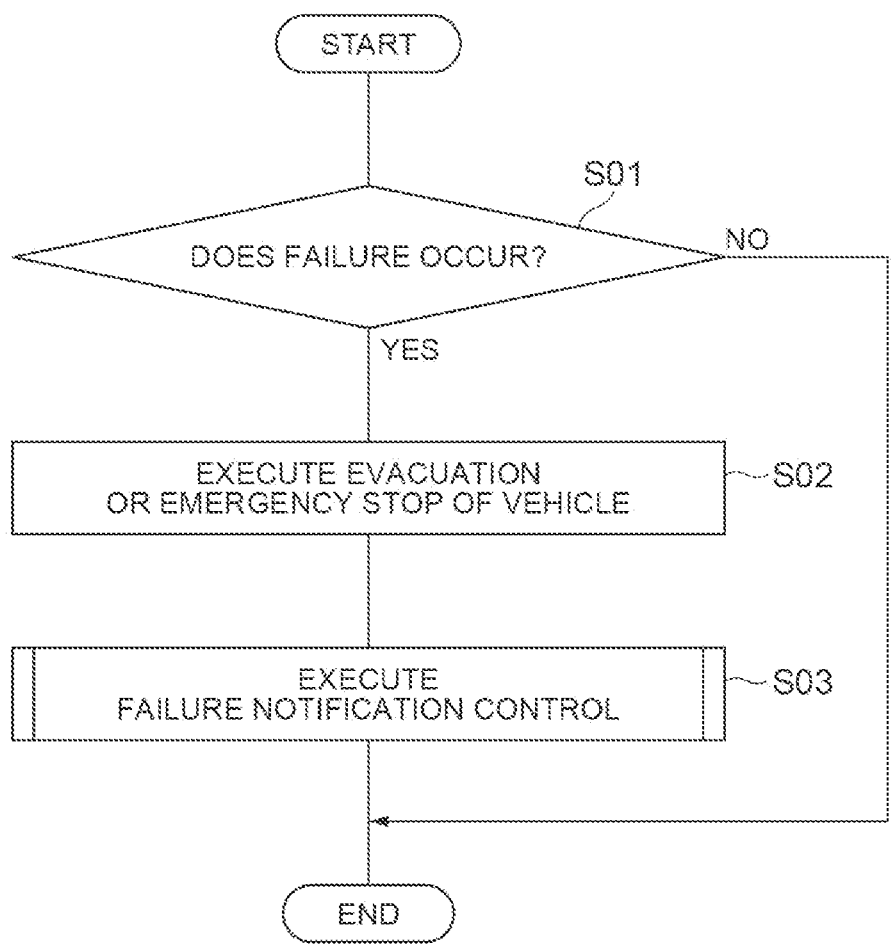
FIG. 6 is a flowchart illustrating a processing example of a notification ECU.

Next, processing of the notification device 1 will be described with reference to FIGS. 6 to 8. FIG. 6 is a flowchart illustrating a processing example of the notification ECU 11. The flowchart illustrated in FIG. 6 is repeatedly executed at predetermined intervals, for example, during autonomous driving of the vehicle 2.

As illustrated in FIG. 6, the autonomous driving ECU 9 of the notification device 1 determines whether or not a failure occurs as S01. The autonomous driving ECU 9 determines whether or not a failure occurs in the vehicle 2 based on, for example, the recognized number or degree of abnormality occurrences based on operation information or diagnostic information of the equipment of the vehicle 2. When the autonomous driving ECU 9 determines that a failure occurs (YES at S01), the autonomous driving ECU 9 shifts the processing to S02. When the autonomous driving ECU 9 determines that no failure occurs (NO at S01), the autonomous driving ECU 9 causes the processing of FIG. 6 to end.

At S02, the autonomous driving ECU 9 executes an evacuation or an emergency stop of the vehicle 2. The autonomous driving ECU 9 executes an evacuation of the vehicle 2 to the outside of the road or an emergency stop of the vehicle 2 depending on, for example, contents of a failure when the failure occurs and a surrounding situation of the vehicle 2.

At S03, the notification ECU 11 executes the failure notification control. The notification ECU 11 specifically performs processing illustrated in FIGS. 7 and 8 as the failure notification control.

Figure 7:
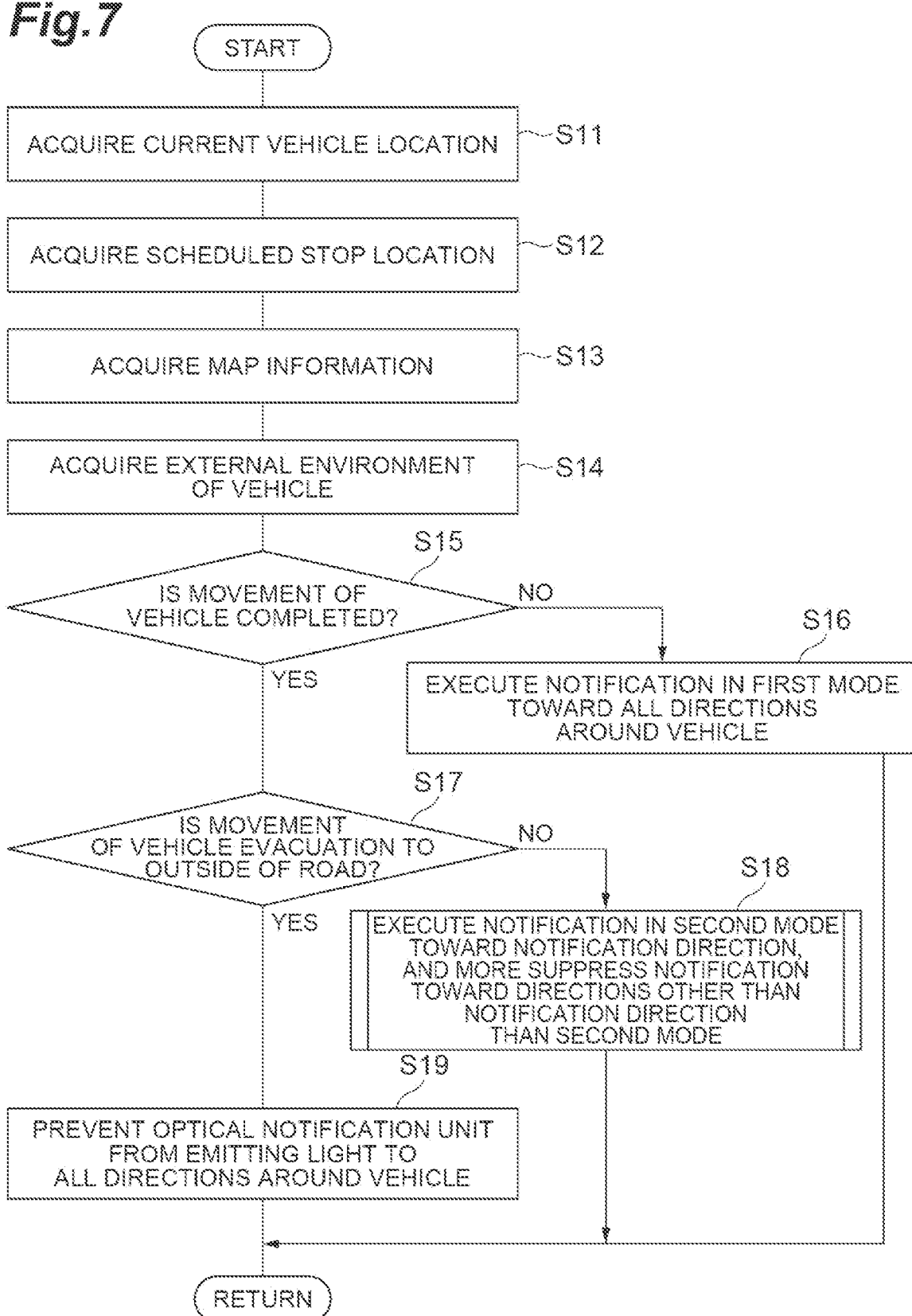
FIG. 7 is a flowchart illustrating the processing example of a failure notification control in FIG. 6.

FIG. 7 is a flowchart illustrating the processing example of a failure notification control in FIG. 6. The processing of FIG. 7 is executed at least after the movement of the vehicle 2 for an evacuation or an emergency stop of the vehicle 2 is completed. Here, as an example, the processing of FIG. 7 is executed from a time when the movement of the vehicle 2 for an evacuation or an emergency stop has started.

As illustrated in FIG. 7, the notification ECU 11 acquires a current vehicle location of the vehicle 2 as S11. The notification ECU 11 acquires a current vehicle location of the vehicle 2 based on location information from the GPS receiver 4, for example. The notification ECU 11 may acquire the current vehicle location of the vehicle 2 by a SLAM technique. The notification ECU 11 may acquire a location of the vehicle 2 on the map recognized by the autonomous driving ECU 9, or may acquire the current vehicle location of the vehicle 2 by techniques of other known methods.

At S12, the notification ECU 11 acquires a scheduled stop location of the vehicle 2. The notification ECU 11 acquires, for example, information of the scheduled stop location decided by the autonomous driving ECU 9, so as to acquire a scheduled stop location of the vehicle 2.

At S13, the notification ECU 11 acquires map information. The notification ECU 11 acquires, for example, a road environment (for example, a road shape, an intersection shape, presence or absence of one-way traffic, and the like) around the scheduled stop location of the vehicle 2 based on the map information. For example, if the vehicle 2 completes the movement for an evacuation or an emergency stop, the notification ECU 11 may acquire the road environment based on the external environment of the vehicle 2 detected by the external sensor 3 (for example, an intersection image imaged by the camera) in addition to the map information or instead of the map information.

At S14, the notification ECU 11 acquires an external environment of the vehicle 2. Based on the detection result of the external sensor 3, the notification ECU 11 acquires a situation of other vehicles (for example, road configurations in which the other vehicles can travel) on the road around the vehicle 2 that has completed the movement for an evacuation or an emergency stop as the external environment of the vehicle 2. The notification ECU 11 can recognize whether or not there are the other vehicles approaching the vehicle 2 based on the road environment and the situation of the other vehicles on the road around the vehicle 2.

At S15, the notification ECU 11 determines whether or not the movement of the vehicle 2 for an evacuation or an emergency stop is completed by the notification direction specifying unit 12. The notification direction specifying unit 12 determines whether or not the movement of the vehicle 2 for an evacuation or an emergency stop is completed based on, for example, the current vehicle location and the scheduled stop location of the vehicle 2. The notification direction specifying unit 12 may determine that the movement of the vehicle 2 for an evacuation or an emergency stop is completed when the current vehicle location of the vehicle 2 reaches the scheduled stop location. The notification direction specifying unit 12 may determine that the movement of the vehicle 2 for an evacuation or an emergency stop is not completed when the current vehicle location of the vehicle 2 does not reach the scheduled stop location. The "current vehicle location of the vehicle 2 reaches the scheduled stop location" means that, for example, the current vehicle location of the vehicle 2 on the map is located within a predetermined range surrounding the scheduled stop location. The notification direction specifying unit 12 may determine whether or not the movement of the vehicle 2 is completed based on the vehicle speed of the vehicle 2 after the movement of the vehicle 2 is started for the evacuation or the emergency stop.

When the notification ECU 11 determines that the movement of the vehicle 2 for an evacuation or an emergency stop is not completed (NO at S15), the notification ECU 11 shifts the processing to S16. When the notification ECU 11 determines that the movement of the vehicle 2 for an evacuation or an emergency stop is completed (YES at S15), the notification ECU 11 shifts the processing to S17.

At S16, the notification ECU 11 executes the notification in the first mode toward all directions around the vehicle 2 by the optical notification control unit 13. The optical notification control unit 13 controls, for example, the optical notification unit 14 so that the optical notification unit 14 emits light in the first mode toward all directions around the vehicle 2. For example, the optical notification control unit 13 may notify all directions around the vehicle 2 in the first mode by causing all the direction indicators 14a to 14f provided on the vehicle 2 to flicker faster than that of the second mode and the third mode. At S16, when the notification direction specifying unit 12 determines that movement of the vehicle 2 for an evacuation or an emergency stop is not completed at S15, the notification direction specifying unit 12 may specify all directions around the vehicle 2 as the notification direction. The notification ECU 11 may not specify the notification direction by the notification direction specifying unit 12. After the processing of FIG. 7 ends, the processing returns to FIG. 6, and the processing of FIG. 6 ends.

At S17, the notification ECU 11 determines whether or not the movement of the vehicle 2 is an evacuation to the outside of the road by the notification direction specifying unit 12. The notification direction specifying unit 12 determines, for example, whether or not the movement of the vehicle 2 is the evacuation to the outside of the road based on the current vehicle location (a location of the vehicle 2 whose movement is completed) or the scheduled stop location of the vehicle 2 and the map information or the external environment of the vehicle 2. For example, when the current vehicle location or the scheduled stop location of the vehicle 2 is an evacuation place outside the road, the notification direction specifying unit 12 determines that the movement of the vehicle 2 is the evacuation to the outside of the road. For example, when the current vehicle location or the scheduled stop location of the vehicle 2 is not the evacuation place outside the road, the notification direction specifying unit 12 determines that the movement of the vehicle 2 is not the evacuation to the outside of the road.

When the notification ECU 11 determines that the movement of the vehicle 2 is not the evacuation to the outside of the road (NO at S17), the notification ECU 11 shifts the processing to S18. When the notification ECU 11 determines that the movement of the vehicle 2 is the evacuation to the outside of the road (YES at S17), the notification ECU 11 shifts the processing to S19.

At S18, the notification ECU 11 executes the notification in the second mode toward the notification direction by the notification direction specifying unit 12 and the optical notification control unit 13, and more suppresses the notification toward the directions other than the notification direction than that of the second mode. The notification ECU 11 specifically performs the processing illustrated in FIG. 8 as the processing of S18.

Figure 8:
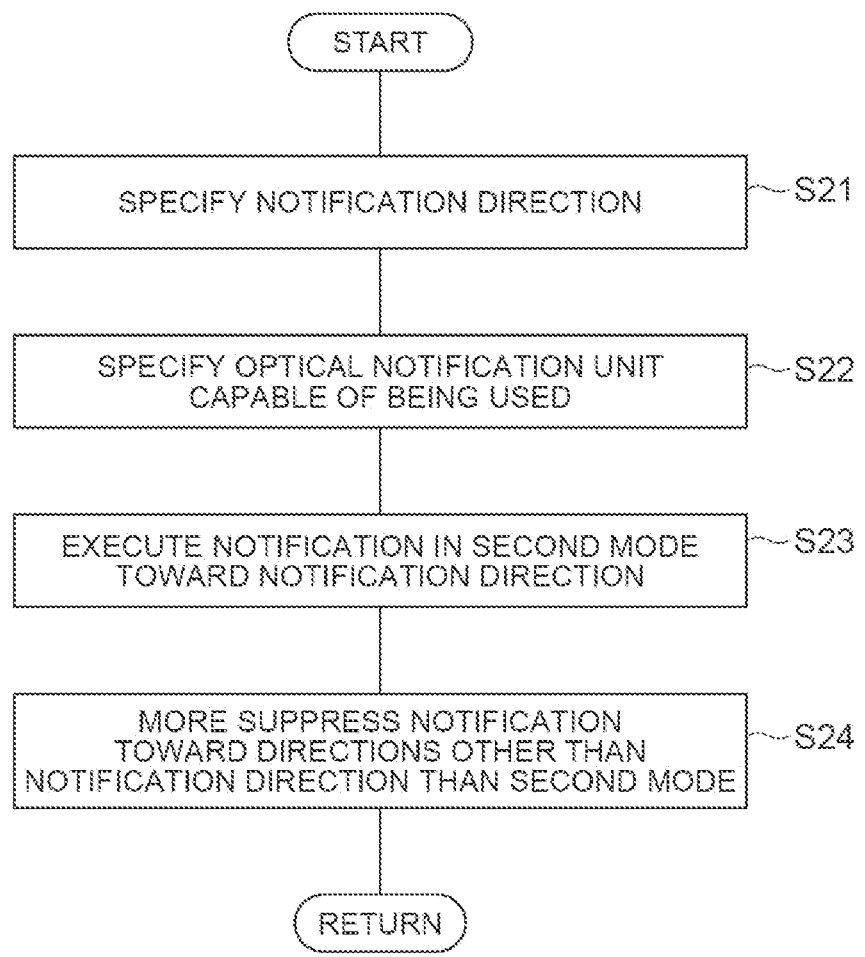
FIG. 8 is a flowchart illustrating the processing example of S18 in FIG. 7.

FIG. 8 is a flowchart illustrating the processing example of S18 in FIG. 7. As illustrated in FIG. 8, at S21, the notification ECU 11 specifies the notification direction by the notification direction specifying unit 12. The notification direction specifying unit 12 specifies the notification direction based on the current vehicle location (the location where the movement of the vehicle 2 is completed) or the scheduled stop location of the vehicle 2 and the map information or the external environment of the vehicle 2. In the scene in which the processing of FIG. 8 (processing of S18 illustrated in FIG. 7) is executed, since the movement of the vehicle 2 is not the evacuation to the outside of the road, the vehicle 2 whose movement has been completed is in the situation of the evacuation or the emergency stop in the road. Therefore, the notification direction specifying unit 12 specifies, for example, a direction in which other vehicles approaching the vehicle 2 that is evacuated or emergently stops in the road may exist, as the notification direction. This notification direction is a direction in which the notification in the second mode is executed.

At S22, the notification ECU 11 performs specification of the optical notification unit 14 capable of being used by the optical notification control unit 13. The optical notification control unit 13 specifies the optical notification unit 14 capable of being used by recognizing which optical notification unit 14 is defective based on, for example, the diagnostic information of the failure that has occurred.

At S23, the notification ECU 11 executes the notification in the second mode toward the notification direction by the optical notification control unit 13. The optical notification control unit 13 executes the notification in the second mode toward the specified notification direction. At S23, the optical notification control unit 13 may execute the notification in the second mode toward the notification direction with respect to the optical notification unit 14 to be used, which is specified at S22, among the optical notification units 14 capable of emitting light in the specified notification direction.

At S24, the notification ECU 11 more suppresses the notification toward directions other than the notification direction by the optical notification control unit 13 than that of the second mode. For example, the optical notification control unit 13 executes the notification in the third mode, which is more suppressed than that of the second mode, toward the directions other than the specified notification direction. That is, the optical notification control unit 13 controls the optical notification unit 14 such that the notification toward directions other than the notification direction is suppressed as compared with the notification toward the notification direction. At S24, the optical notification control unit 13 may execute the notification in the third mode toward directions other than the notification direction with respect to the optical notification unit 14 to be used, which is specified at S22 among the optical notification units 14 capable of emitting light to the directions other than the notification direction. The optical notification control unit 13 may prevent the optical notification unit 14 from emitting light to the directions other than the specified notification direction. Thereafter, the processing of FIG. 8 ends and returns to FIG. 7, and the processing of FIG. 7 ends and returns to FIG. 6, and then the processing of FIG. 6 ends.

On the other hand, returning to FIG. 6, at S19, the notification ECU 11 prevents the optical notification unit 14 from emitting light to all directions around the vehicle 2 by the optical notification control unit 13. For example, the optical notification control unit 13 causes the optical notification unit 14 to emit no light to all directions around the vehicle 2 by stopping the power supply to all the optical notification units 14. At S19, the notification ECU 11 may specify the notification direction by the notification direction specifying unit 12. The notification direction specifying unit 12 may specify that, for example, there is no notification direction. In this case, all directions around the vehicle 2 correspond to the directions other than the notification direction. After the processing of FIG. 7 ends, the processing returns to FIG. 6, and the processing of FIG. 6 ends.

As described above, in the notification device 1, the notification direction specifying unit 12 specifies the notification direction that is a direction in which the notification to the outside of the vehicle is performed using the optical notification unit 14 when the failure occurs. Therefore, the optical notification unit 14 can perform the notification toward the direction in which the notification to the outside of the vehicle is required according to a situation around the vehicle 2. The optical notification control unit 13 controls the optical notification unit 14 such that the notification toward the directions other than the notification direction is suppressed as compared with the notification toward the notification direction. Therefore, the electric power consumption due to the light toward a direction other than the notification direction emitted from the optical notification unit 14 can be suppressed. Therefore, with the notification device 1, it is possible to perform the notification to the outside of the vehicle according to a situation around the vehicle 2 while suppressing the electric power consumption of the optical notification unit 14 when the vehicle 2 is evacuated or emergently stops due to the failure.

In the notification device 1, the optical notification control unit 13 performs the failure notification control to suppress the notification after the vehicle 2 completing the movement for an evacuation or an emergency stop as compared with the notification when the vehicle 2 is moving for an evacuation or an emergency stop. Therefore, the electric power consumption of the optical notification unit 14 after completing the movement of the vehicle 2 for an evacuation or an emergency stop can be suppressed as compared with electric power consumption during the movement of the vehicle 2 for an evacuation or an emergency stop.

In the notification device 1, the optical notification control unit 13 performs the failure notification control to suppress the notification toward all directions around the vehicle 2 as compared with the notification when the vehicle 2 is moving for an evacuation, if the vehicle 2 is evacuated outside the road when the failure occurs. Therefore, the electric power consumption of the optical notification unit 14 can be further suppressed according to the situation in which there is little possibility that other vehicles that travel the road, or the like approach the vehicle 2 evacuated to the outside of the road.

In the notification device 1, the optical notification control unit 13 performs the failure notification control to suppress the notification by preventing the optical notification unit 14 from emitting light. Therefore, the electric power consumption of the optical notification unit 14 can be further surely suppressed.

MODIFICATION EXAMPLE

The notification device can be implemented in various forms including the above-described examples. A modified example may also be configured by incorporating any suitable feature of the above-described examples. The configurations of the respective examples may be combined and used as appropriate.

For example, in the above-described examples, in the failure notification control, the optical notification control unit 13 suppresses the notification in the second mode after completing the movement of the vehicle 2 for an evacuation or an emergency stop as compared with the notification in the first mode when the vehicle 2 is moving for an evacuation or an emergency stop, but the present disclosure is not limited thereto. That is, although the second mode is a light emission mode that is more suppressed than that of the first mode, as differing from the first mode, the second mode may be the same light emission mode as the first mode. It is not always necessary that the optical notification control unit 13 suppresses the notification after completing the movement of the vehicle 2 for an evacuation or an emergency stop as compared with the notification when the vehicle 2 is moving for an evacuation or an emergency stop. For example, the notification when the vehicle 2 is moving for an evacuation or an emergency stop may be omitted.

In the above-described examples, when the vehicle 2 is evacuated to the outside of the road during the occurrence of the failure, the optical notification control unit 13 controls the optical notification unit 14 so that the optical notification unit 14 emit no light to all directions around the vehicle 2, but the present disclosure is not limited thereto. For example, the optical notification control unit 13 may control the optical notification unit 14 to perform the notification in the third mode toward all directions around the vehicle 2 when the vehicle 2 is evacuated to the outside of the road during the occurrence of the failure. That is, the notification toward all directions around the vehicle 2 when the vehicle 2 is evacuated to the outside of the road during the occurrence of the failure is suppressed as compared with the notification when the vehicle 2 is moving for the evacuation. It is not always necessary that the notification toward all directions around the vehicle 2 when the vehicle 2 is evacuated to the outside of the road during the occurrence of the failure is suppressed as compared with the notification when the vehicle 2 is moving for the evacuation. For example, the notification when the vehicle 2 is moving for an evacuation or an emergency stop may be omitted.

In the above-described examples, the optical notification control unit 13 may cause the optical notification unit 14 to emit no light, but it is not always necessary that the optical notification unit 14 emits no light.

For example, the optical notification unit 14 does not need to be provided outside the vehicle 2 and may be provided at a position inside the vehicle such as a position inward of the windshield glass as long as it is possible to perform notification about information toward the outside of the vehicle. The optical notification unit 14 may perform notification about information by using letters. The optical notification unit 14 may be a retrofit light source device. Alternatively, the optical notification unit 14 may be a projector that displays an optical painting on a road surface.

What is claimed is:

1. A notification device provided on a vehicle performing an evacuation or an emergency stop when a failure occurs, the notification device comprising:
   an optical notification unit provided on the vehicle and configured to emit light toward an outside of the vehicle;
   an electronic control unit configured to:
      specify a notification direction based on a current vehicle location, a scheduled stop location of the vehicle and map information or an external environment of the vehicle, the notification direction being a direction in which notification to the outside of the vehicle is performed using the optical notification unit when the failure occurs;
      control the optical notification unit to operate in a first mode during movement of the vehicle for the evacuation or the emergency stop;
      control the optical notification unit to operate in a second mode toward the notification direction after the movement of the vehicle for the evacuation or the emergency stop is completed;
      control the optical notification unit to operate in a third mode toward directions other than the notification direction after the movement of the vehicle for the evacuation or the emergency stop is completed; and
      in the event that the scheduled stop location is at an intersection due to the failure causing the vehicle to make the emergency stop at the intersection, specify directions in which lanes of the intersection other than the lane that the vehicle was heading towards extend as the notification direction when the vehicle crossing an oncoming lane does not stop beyond a center of the intersection, and not specify the directions in which the lane of the intersection that the vehicle was heading towards extend as the notification direction when the vehicle crossing the oncoming lane stops beyond the center of the intersection.

2. The notification device according to claim 1,
wherein the electronic control unit suppresses notification by the optical notification unit in the second mode compared to the first mode.

3. The notification device according to claim 1,
wherein the electronic control suppresses notification by the optical notification unit toward all directions around the vehicle as compared with notification when the vehicle is moving for an evacuation, when the vehicle is evacuated outside a road when the failure occurs.

4. The notification device according to claim 2,
wherein the electronic control unit suppresses the notification by the optical notification unit by preventing the optical notification unit from emitting light.

5. The notification device according to claim 1, wherein the optical notification unit is a direction indicator provided on the vehicle.

6. The notification device according to claim 1, wherein the second mode has a stronger visual stimulus than the third mode and the second mode has a weaker visual stimulus than the first mode.

7. A notification device provided on a vehicle performing an evacuation or an emergency stop when a failure occurs, the notification device comprising:
an optical notification unit provided on the vehicle and configured to emit light toward an outside of the vehicle;
an electronic control unit configured to:
specify a notification direction based on a current vehicle location or a scheduled stop location of the vehicle and map information or an external environment of the vehicle, the notification direction being a direction in which notification to the outside of the vehicle is performed using the optical notification unit when the failure occurs;
control the optical notification unit to operate in a first mode during movement of the vehicle for the evacuation or the emergency stop;
control the optical notification unit to operate in a second mode toward the notification direction after the movement of the vehicle for the evacuation or the emergency stop is completed;
control the optical notification unit to operate in a third mode toward directions other than the notification direction after the movement of the vehicle for the evacuation or the emergency stop is completed; and
in the event that the scheduled stop location is at an intersection due to the failure causing the vehicle to make the emergency stop at an intersection, specify directions in which lanes of the intersection other than the lane that the vehicle was heading towards extend as the notification direction when the vehicle crossing an oncoming lane does not stop beyond a center of the intersection, and not specify the directions in which the lane of the intersection that the vehicle was heading towards extend as the notification direction when the vehicle crossing the oncoming lane stops beyond the center of the intersection;
wherein the electronic control unit controls the optical notification unit such that notification toward directions other than the notification direction is suppressed as compared with notification toward the notification direction,
wherein the notification direction is a direction in which an other vehicle may exist, the other vehicle approaching the vehicle whose movement for an evacuation or an emergency stop has been completed,
wherein the electronic control unit suppresses notification by the optical notification unit in the second mode compared to the first mode, and
wherein an electric power consumption of the optical notification unit is suppressed in a light emission mode of the optical notification unit toward directions other than the notification direction compared to a light emission mode of the optical notification unit toward the notification direction, after the movement of the vehicle for the evacuation or the emergency stop in a road is completed.

8. The notification device according to claim 7, wherein the electronic control unit suppresses notification toward all directions around the vehicle by preventing the optical notification unit from emitting light as compared with notification when the vehicle is moving for an evacuation, when the vehicle is evacuated outside a road when the failure occurs.

9. The notification device according to claim 7, wherein the optical notification unit is a direction indicator provided on the vehicle.

10. The notification device according to claim 3,
wherein the electronic control unit suppresses the notification by the optical notification unit by preventing the optical notification unit from emitting light.

* * * * *